United States Patent [19]

Sturm

[11] 4,349,219

[45] Sep. 14, 1982

[54] WELDING MUFF OF THERMOPLASTIC MATERIAL

[75] Inventor: Werner Sturm, Hägendorf, Switzerland

[73] Assignee: Von Roll A.G., Switzerland

[21] Appl. No.: 177,762

[22] PCT Filed: Apr. 19, 1979

[86] PCT No.: PCT/CH79/00054

§ 371 Date: Dec. 21, 1979

§ 102(e) Date: Nov. 28, 1979

[87] PCT Pub. No.: WO79/00961

PCT Pub. Date: Nov. 15, 1979

[30] Foreign Application Priority Data

Apr. 21, 1978 [CH]  Switzerland ............... 4344/78

[51] Int. Cl.³ ............................................. F16L 47/02
[52] U.S. Cl. ..................................... 285/21; 285/369; 285/423
[58] Field of Search ..................... 285/21, 22, 41, 423, 285/364, 417, 288, 149, DIG. 20; 174/76; 156/272, 275, 380; 264/27, 272, 275, 332; 219/544, 535; 425/174.6

[56] References Cited

U.S. PATENT DOCUMENTS

| 2,223,434 | 12/1940 | Trilkey | 285/288 |
| 3,094,452 | 6/1963 | Von Riegen et al. | 285/21 X |
| 3,422,179 | 1/1969 | Bauer et al. | 285/21 X |
| 3,943,334 | 3/1976 | Sturm | 285/21 X |
| 3,954,541 | 5/1976 | Landgraf | 156/275 |

FOREIGN PATENT DOCUMENTS

| 1071433 | 12/1959 | Fed. Rep. of Germany | 285/21 |
| 2182587 | 12/1973 | France | 285/21 |

*Primary Examiner*—David Arola
*Attorney, Agent, or Firm*—Roylance, Abrams, Berdo & Farley

[57] ABSTRACT

An electric welding muff for joining thermoplastic line elements comprising a welding sleeve and an electrical resistance heating wire. The sleeve is formed of thermoplastic material. The heating wire is wound in a plurality of turns and embedded in the sleeve adjacent one of its lateral surfaces and has peripherally spaced deformation points diverging from the general course of the turns. During manufacture and welding, the heating wire remains in its predetermined position since expansion of the wire is absorbed at the deformation points.

10 Claims, 5 Drawing Figures

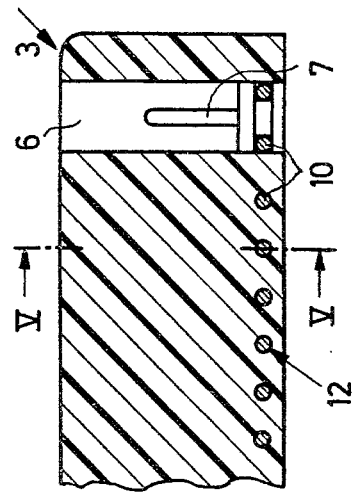
FIG. 4
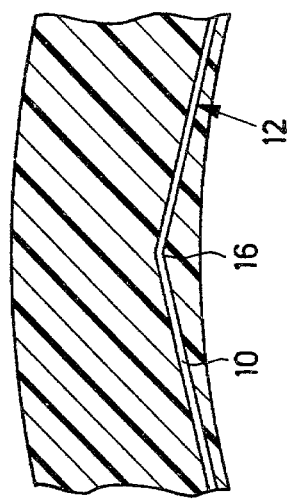
FIG. 5
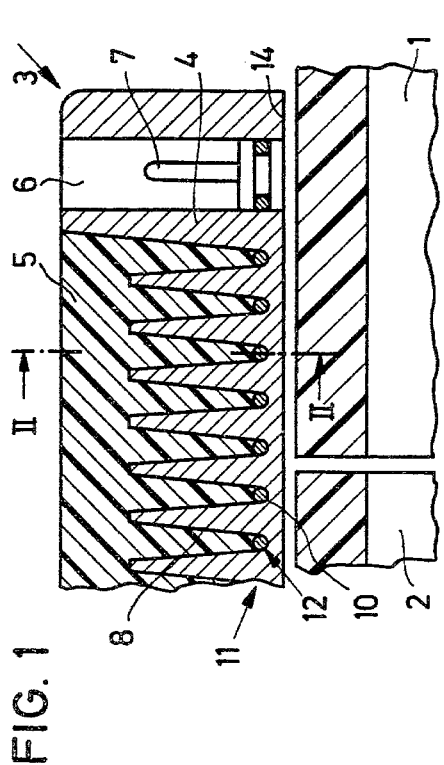
FIG. 1
FIG. 2
FIG. 3
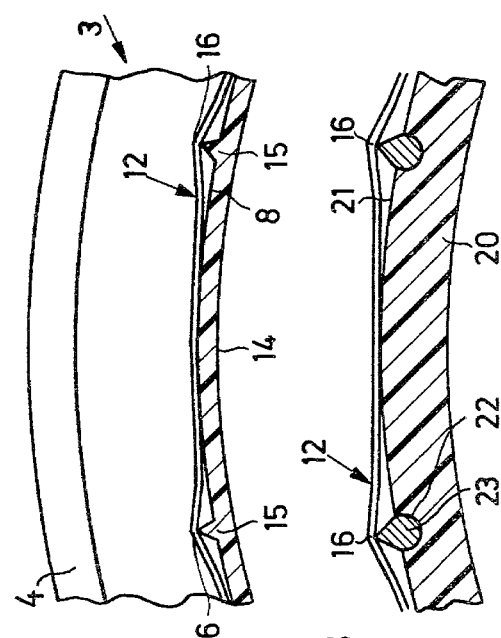

WELDING MUFF OF THERMOPLASTIC MATERIAL

The invention relates to a welding muff with a shell-like sleeve member made from thermoplastic material, the welding heat necessary for melting the thermoplastic material being produced by an electrical current in the turns of the winding of an electrical resistance heating wire arranged in the sleeve member joining zone.

Various constructions of welding sleeves for joining line elements and tubular members, such as pipes, fittings and valves in line systems made from thermoplastic material are known. They are either part of the pipe portions, fitting and valves, i.e. integrally connected thereto, or are constructed as independent components in the form of a sleeve-like body. For joining together the individual tubular parts, their ends are fitted into one another with the aid of the welding sleeve and are then welded together, the heat necessary for melting the thermoplastic material in the joining zone of the thermoplastic parts being produced by supplying electrical current to a resistor.

In a known and frequently used construction of the welding sleeve a winding of an electrical resistance heating wire with axially spaced turns is provided as a resistor in the area of the sleeve member joining zone. The individual turns of the winding are located on the inner wall of the sleeve member. The arrangement on the inner wall of the sleeve member means that the turns of the resistance heating wire are as close as possible to the inner wall and the thin thermoplastic material layer only has a limited thickness of e.g. 0.5 mm and mainly serves as protection against electric shock hazard. The closer the electrical resistance heating wire comes to the inner wall the more reliable the welding of the parts to be joined.

However, problems occur in practice in the manufacture of such welding sleeves which are prejudicial to the above-described ideal solution of a sleeve with filament winding located directly on the inner wall of the sleeve member. There is therefore no need to investigate in greater detail the manufacture of such a welding sleeve. For the manufacture of a known electrical welding sleeve with electrical heating coil a thermoplastic-coated filament is wound in turns onto a mandrel, which is subsequently injection moulded in a mould. In this manufacturing method, the mandrel is always larger than the subsequently moulded part, which on cooling is subject to a certain shrinkage. Due to the shrinkage of the sleeve member, it is not possible to prevent the moulded filament from being under a certain compressive stress. On connecting an electrical heating system to such a welding sleeve the resistance heating wire expands and, because it directly melts the thermoplastic material surrouding it, assumes a position corresponding to a larger diameter than the diameter of the winding turns wound onto the mandrel.

In another manufacturing procedure, the resistance heating wire is placed in a helical slot previously worked into the inside of the sleeve member. Here again, on heating the sleeve member, there is a longitudinal expansion of the wire and consequently the winding is removed from the joining zone.

In the above-mentioned, known constructions of the welding sleeve when making junctions a phenomenon occurs which impairs the joining quality and leads to a movement of the turns in the filament winding. If the distance of the turns from the joining zone is so large that there is not a complete melting of the inner wall, a typical molecular material connection for a weld no longer takes place in the joining zone of the thermoplastic parts to be connected and instead there is only a more or less strong shrink joint.

The problem of the present invention is therefore to so further develop a welding sleeve of the above-defined type, whilst avoiding the disadvantages of the known constructions, that reliable and faultless welding is guaranteed at the connection zone of the thermoplastic parts to be connected.

According to the invention, this problem is solved in that the turns of the resistance heating wire winding arranged on the inner wall of the sleeve member have peripherally spaced deformation points diverging from the general course of the turn. As a result, on connecting the electrical heating system to the welding sleeve, there is substantially no movement of the resistance heating wire away from the joining zone and instead the lengthening of the wire caused by the thermal expansion is localised in the deformations, where it leads to a further deformation, whilst the position of the individual turns overall remains unchanged.

The invention is described in greater detail hereinafter relative to embodiments and the attached drawings, wherein show:

FIG. 1 a section through a partly diagrammatically shown welded joint of two tubular members using a separate welding sleeve on a larger scale.

FIG. 2 a section along the line II—II of FIG. 1.

FIG. 3 a section through a partly diagrammatically shown moulded part for producing a welding sleeve with a heating wire winding wound onto it and on a larger scale.

FIG. 4 a section through a partly diagrammatically shown welding sleeve on a larger scale.

FIG. 5 a section along the line V—V of FIG. 4.

FIG. 1 shows a connection of two only partly represented tubular members 1, 2 made from a thermoplastic material by means of an also only partly shown sleeve member 3 of a welding muff of thermoplastic material placed over the two tubular parts 1, 2. The sleeve member 3 comprises a sleeve inner part 4 and a sleeve outer part 5. A bore 6 is provided on the edge of the sleeve inner part 4 in which is placed a contact pin 7.

The sleeve inner part 4 has grooves 8 in which is inserted a resistance heating wire or filament 10 in a winding 11 with axially spaced turns 12. The resistance heating wire 10 terminates in contact pin 7. At the other not shown end of sleeve member 3 is an identical contact pin for the other end of the resistance heating wire 10. The turns 12 arranged in the bottom of the grooves 8 are located in the immediate vicinity of the inner wall 14 of the sleeve inner part 4. In actual constructions of welding sleeves, the spacing is approximately 0.5 mm.

The section through the sleeve member 3 of FIG. 2 shows a cross-section through a groove 8 with a turn 12 of the resistance heating wire 10 inserted therein. On the bottom of the groove 8 are arranged peripherally spaced weir-shaped ridges 15, which are at right angles to groove 8 and whose apices in the case of conventional welding sleeve sizes are approximately 1 mm above the bottom of the groove 8. As a result of the ridges 15 when winding the resistance heating wire 10, each turn 12 has a number of bending or deformation points 16 which corresponds to the number of ridges 15.

At the bending or deformation points there is a divergence or discontinuity with respect to the course of the turn leading to an easily deformable point. If the resistance heating wire is heated on connecting the electrical heating system to the welding sleeve there is surprisingly no migration of the turn from the connecting zone of the parts to be connected. The extension of the wire 10 resulting from the heating is absorbed by the deformation at the bending or deformation points 16. However, overall, there is no change in the position of turn 12. If there are no bending or deformation points 16, the extension which occurs leads to the radial displacement of the resistance heating wire 10. Thus, the resistance heating wire 10 moves away from the connecting zone of the parts to be connected, so that a completely satisfactory welding of the parts 1, 2 to be connected is no longer ensured. This disadvantage is obviated in a surprisingly simple manner by providing the bending or deformation points 16.

FIG. 5 shows a section through a further welding sleeve, whose sleeve member 3 is in one part. As is apparent from FIG. 5, the turns 12 of the resistance heating wire 10 also have on their periphery bending or deformation points 16. The way in which the latter are made is illustrated by means of FIG. 3 which shows a section through a moulded part 20 for the injection moulding of a welding sleeve of thermoplastic material. The welded part 20, which can also be called the mandrel, can be in one or several parts. Its outside 21 carries axially directed slots 22 in which are guided ridges 23 which project over the outside 21 of mandrel 20 in accordance with the height of the ridges 15 in FIG. 2. If the winding 11 is now wound onto the mandrel 20, the individual turns form the same bending or deformation points 16, as in the case of ridges 15 of the welding sleeve according to FIGS. 1 and 2. Thus, the action of the bending or deformation points 16 brought about by ridges 23 is the same as in the case of the welding sleeve of FIGS. 1 and 2.

The mandrel 20 is now placed in the mould for the injection moulding of the welding sleeve and the turns 12 of the winding are moulded. After the injection moulding of the welding sleeve, the ridges 23 and then the mandrel 20 are removed. Despite the shrinkage of the moulded sleeve member 3, the bending or deformation points 16 prevent the occurrence of a compressive stress in the resistance heating wire 10. Wire 10 is only slightly within the inner wall of sleeve member 3, of FIGS. 4 and 5, because due to the bending or deformation points 16 there can be virtually no displacement of the individual turns 12 of wire 10.

I claim:

1. An electric welding muff for joining thermoplastic line elements, comprising
   a cylindrical welding sleeve formed of thermoplastic material; and
   an electrical resistance heating wire wound in a plurality of turns following a generally circular course and forming a helix coaxial with said sleeve, said turns being embedded in said sleeve adjacent a lateral surface thereof and having peripherally spaced deformation points diverging from said circular course of said turns.

2. An electric welding muff according to claim 1, wherein said welding sleeve has a joining zone adjacent an inner surface thereof and said heating wire is embedded in said joining zone.

3. An electric welding muff according to claim 1, wherein said welding sleeve has a plurality of ridges forming said deformation points in said heating wire.

4. An electric welding muff according to claim 3, wherein said ridges project radially and extend axially of said welding sleeve.

5. An electrical welding muff for joining thermoplastic line elements, comprising
   a welding sleeve formed of thermoplastic material, said welding sleeve comprising inner and outer parts, said inner part having grooves formed about an outer surface thereof, said grooves having ridges formed therein; and
   an electrical resistance heating wire wound in a plurality of turns, said turns being embedded in said sleeve adjacent a lateral surface thereof, being received in said inner part grooves and having peripherally spaced deformation points at said ridges diverging from a general course of said turns.

6. An electric welding muff according to claim 5, wherein said ridges comprise transverse members on bottoms of said grooves.

7. An electric welding muff for joining thermoplastic line elements, comprising
   a welding sleeve formed of thermoplastic material and consisting of a unitary, molded member; and
   an electrical resistance heating wire wound in a plurality of turns, said turns being embedded in said sleeve adjacent a lateral surface thereof and having peripherally spaced deformation points diverging from a general course of said turns, said deformation points being formed in said heating wire by winding said heating wire on a mandrel having ridges thereon prior to molding said welding sleeve over said heating wire.

8. An electric welding muff according to claim 7, wherein said ridges project radially and extend axially of said mandrel.

9. An electric welding muff according to claim 7, wherein said ridges project from an outer surface of said mandrel.

10. An electric welding muff according to claim 9, wherein said mandrel has axially extending slots in said outer surface and said ridges comprise profiled rods removably mounted in said slots.

* * * * *